United States Patent

Karasudani et al.

Patent Number: 5,237,406
Date of Patent: Aug. 17, 1993

[54] INTER-CAR DISTANCE DETECTING DEVICE

[75] Inventors: Keiko Karasudani; Tatsuji Irie, both of Hyogo, Japan

[73] Assignee: Mitsubishi Denki K.K., Tokyo, Japan

[21] Appl. No.: 828,180

[22] Filed: Jan. 30, 1992

[30] Foreign Application Priority Data

Feb. 8, 1991 [JP] Japan .................................. 3-17948
Feb. 8, 1991 [JP] Japan .................................. 3-17950

[51] Int. Cl.$^5$ ............................................. H04N 7/18
[52] U.S. Cl. ..................................... 358/105; 358/126
[58] Field of Search ............... 358/105, 103, 93, 108, 358/126; 364/516, 517

[56] References Cited

U.S. PATENT DOCUMENTS

| | | | |
|---|---|---|---|
| 4,709,264 | 11/1987 | Tamura et al. | 358/105 |
| 4,819,169 | 4/1989 | Saitoh et al. | 358/103 |
| 5,023,712 | 6/1991 | Kajiwara | 358/105 |

FOREIGN PATENT DOCUMENTS 63-38085 7/1988 Japan .
1-35305 7/1989 Japan .

Primary Examiner—Alvin E. Oberley
Assistant Examiner—Minsun Oh
Attorney, Agent, or Firm—Sughrue, Mion, Zinn, Macpeak & Seas

[57] ABSTRACT

An inter-car distance detecting device of the invention includes an: image sensor for picking up the image of a car ahead through a pair of optical systems arranged substantially vertically; a display for displaying the image of the car ahead; a first window surrounding the image of the car ahead; an image tracker for tracking the image of the car ahead with the first window; a second window set in the first window; first and second distance detectors for calculating the distances from the objects held in the first and second windows, respectively; and a window position corrector for correcting the position of the first window according to the distances calculated by those distance detectors. The driver can thus readily detect the distance between his car and the car ahead. Even if the window is shifted from the image of the car ahead for instance when his car bounds, the image of the car ahead can be stably tracked. In addition, the position of the window can be corrected with high accuracy. That is, the image of the car ahead can be tracked with high stability.

6 Claims, 4 Drawing Sheets

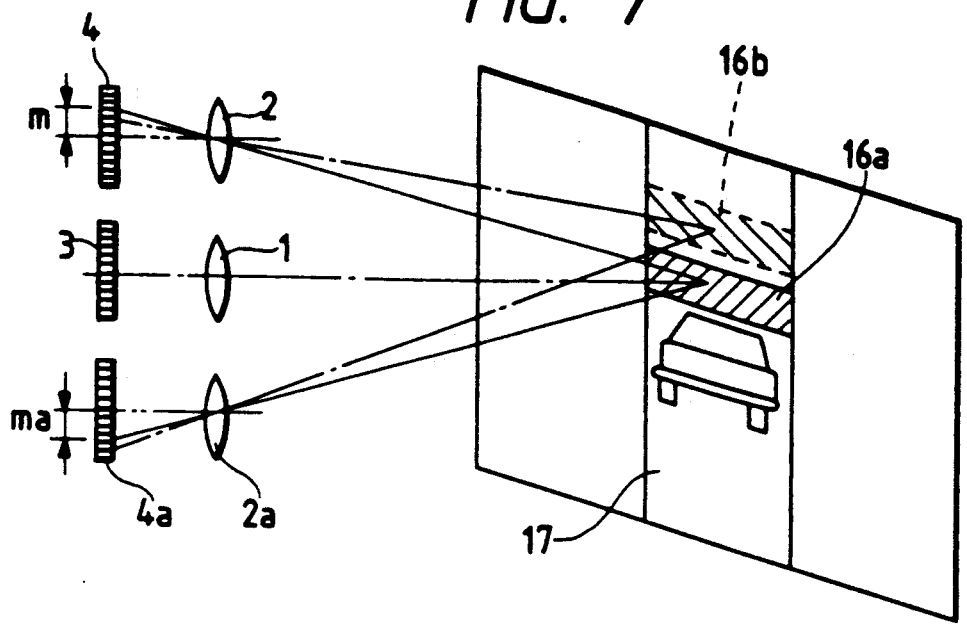
FIG. 7
PRIOR ART
FIG. 11
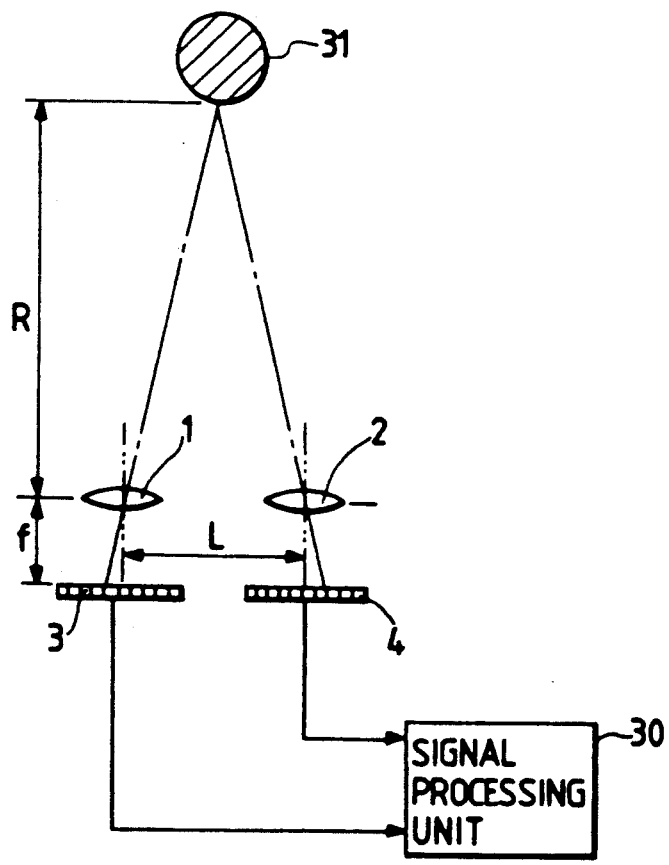

INTER-CAR DISTANCE DETECTING DEVICE

FIELD OF THE INVENTION

This invention relates to an optical distance detecting device with image sensors, and more particularly to a device for detecting the distance between a car and the one ahead continuously (hereinafter referred to as "an inter-car distance detecting device", when applicable).

BACKGROUND OF THE INVENTION

An optical distance detecting device with image sensors has been disclosed, for instance, by Japanese Patent Examined Publication Nos. Sho-63-38085/(1988) and Sho-63-46363/(1988). The device, as shown in FIG. 11, comprises two right and left optical systems which are made up of lenses 1 and 2 which are spaced by a base length L from each other.

Image sensors 3 and 4 are arranged at the focal length f of the lenses 1 and 2, respectively. The image signals of the image sensors 3 and 4 are applied to a signal processing unit 30, where they are successively shifted so as to be electrically superposed on each other. When the image signals are superposed best, the amount of shift (n) is detected to calculate the distance (R) to the object 31 by the following Equation (1) according to the trigonometrical measurement:

$$R = (f \times L)/n \qquad (1)$$

On the other hand, a method of tracking the image of the car ahead which is picked up by an image sensor or the like has been disclosed, for instance, by Japanese Patent Examined Publication No. Sho-60-33352/(1985). In the method, a target selected is tracked as follows: The operator, while watching the display screen, sets a window on it in such a manner as to surround a target to be tracked while watching it.

In the conventional distance detecting device, the images picked up by the right and left optical systems are subjected to comparison to obtain the distance to the object. Hence, the following difficulty is involved when the device is mounted on a car to measure the distance to a car ahead. That is, if, during the measurement, other cars come on the right and/or left sides of the car ahead, then the operator (or the driver) cannot determine which of the distances the device has measured.

Let us consider the case where an image pickup device is mounted on a first car, and the distance from a second car ahead of it is measured with the device. If, in this case, the first car bounds because the road is uneven, then the window tracking the image of the second car ahead bounds with respect to the latter. On the other hand, when the second car ahead increases the speed, or the first car decreases the speed, then the distance between the two cars becomes longer. In this case, the ratio of the image of the second car ahead picked up by the image sensor to the window in area is decreased, so that it is liable to be affected by the image of the background. As a result, the image of the second car ahead is shifted from the window. Thus it is impossible to stably track the image of the second car ahead.

SUMMARY OF THE INVENTION

Accordingly, an object of this invention is to eliminate the above-described difficulties accompanying a conventional inter-car distance detecting device. More specifically, an object of the invention is to provide an inter-car distance detecting device which includes in combination a conventional optical inter-car distance detecting device and a device for tracking the image of a car ahead, and with which, even when a target selected is moved, the distance from it can be continuously measured as long as it is in the field of vision, and even when a plurality of cars are traveling ahead, it can be determined which of the cars ahead is under the measurement. Further another object of the invention is to provide an inter-car distance detecting device which stably tracks the image of a car ahead.

The foregoing object of the invention has been achieved by the provision of an inter-car distance detecting device in which image signals representing images formed on upper and lower image sensors through a pair of optical systems arranged substantially vertically are compared with each other, so as to electrically detect the amount of shift of the images from each other, thereby to measure the distance between a first car and a second car ahead of the first car; the distance detecting device according to the invention, comprising: display unit for displaying the image of the second car picked up by one of the upper and lower image sensor; a first window for surrounding the image of the second car; image tracking unit for tracking the image of the second car with the first window; first distance detecting unit for detecting a difference between image signals representing upper and lower images corresponding to each other with an image signal representing an image in the first window as a reference image signal, to calculate the distance between the first car and the second car ahead; a second window set in the first window; a second distance detecting unit for detecting a difference between image signals representing upper and lower images corresponding to each other with an image signal representing an image in the second window as a reference image signal, to calculate the distance from the first car and an object specified with the second window; and window position correcting unit for correcting the position of the first window surrounding the image of the second car, according to distance data detected by the first and second distance detecting unit.

Furthermore, the distance detecting device according to the invention further comprises window size changing unit for changing the first and second windows in size according to the distance data provided by the first distance detecting unit.

In the inter-car distance detecting device of the invention, the first distance detecting unit operates to detect the difference between the image signals representing the upper and lower image corresponding to each other with the image signal representing the image in the first window as the reference signal, to calculate the distance between the first car and the second car ahead, and the second distance detecting unit operates to detect the difference between the image signals representing the upper and lower images corresponding to each other with an image signal representing the image in the second window as the reference signal, to measure the distance from an object the image of which is held in the second window.

Further in the device of the invention, the first window position correcting unit monitors the position of the first window which the image tracking unit sets according to the distance calculated in the above-described manner, thereby to correct the position of the first window; and the window size changing unit for changing the first and second windows in size, monitors the size of the first window which the image tracking means sets, and that of the second window set in the first window, according to the distance calculated by the first distance detecting unit, thereby to suitably change the size of them.

BRIEF DESCRIPTION OF THE DRAWINGS

FIG. 7 is an explanatory diagram showing an arrangement in which an image sensor adapted to pick up a comparison image is set above an image sensor adapted to pick up a reference image for distance calculation, and another arrangement in which the former image sensor is set below the latter sensor image.

FIG. 11 is an explanatory diagram, partly as a block diagram, showing the arrangement of a conventional distance detecting device.

DESCRIPTION OF THE PREFERRED EMBODIMENTS

Figure 1:
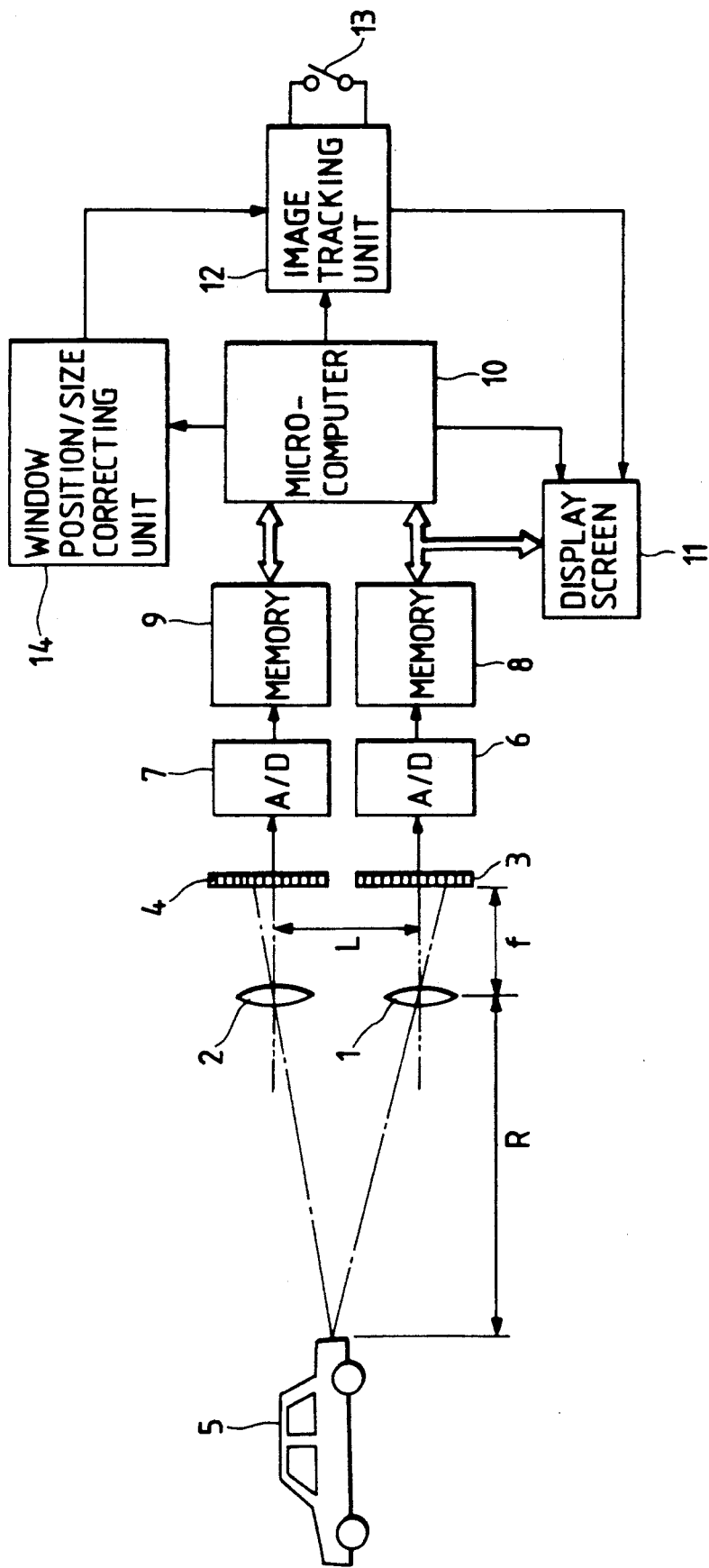
FIG. 1 is an explanatory diagram, partly as a block diagram, showing the arrangement of one example of an inter-car distance detecting device according to this invention.

Preferred embodiments of this invention will be described with reference to the accompanying drawings. In FIG. 1, reference numerals 1 and 2 designate upper and lower optical systems, namely, lenses; 3 and 4, two-dimensional image sensors arranged for the lenses 1 and 2, respectively; 5, a car ahead to be tracked; 6 and 7, analog-to-digital converters; 8 and 9, memories; 10, a microcomputer; and 11, a display screen on which the image picked up by the lower image sensor 3 is displayed. The display screen is controlled by the microcomputer.

Figure 3:
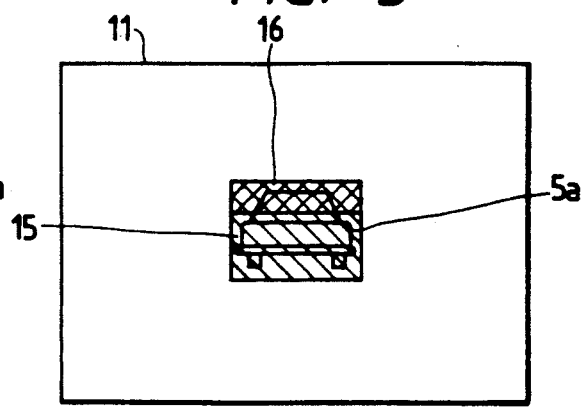
FIG. 3 is an explanatory diagram showing the image of the car ahead coming in a first window.

Further in FIG. 1, reference numeral 12 designates an image tracking unit. As shown in FIG. 3, the image tracking unit 12 operates to form a first window 15 for tracking the image 5a of the car ahead, as shown in FIG. 3, and a second window 16 formed in the first window 15, and to track the image 5a of the car ahead.

Further in FIG. 1, reference numeral 13 designates an image tracking instruction switch which is operated by the operator (or the driver); and 14, a window position/size correcting unit (hereinafter referred to as "window correcting unit") which, according to the distance data operated by the microcomputer, corrects the position of the first window 15 set by the image tracking unit 12, and renews the size of the first and second windows 15 and 16.

Figure 2:
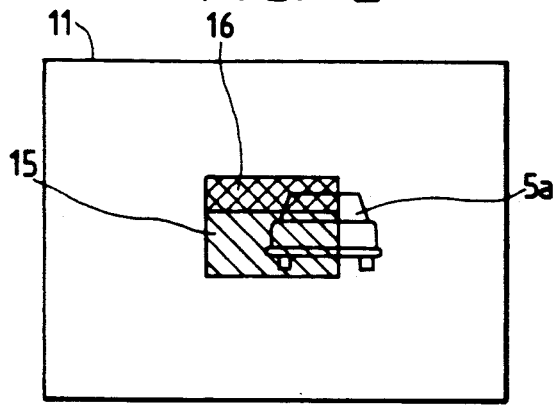
FIG. 2 is an explanatory diagram showing the image of a car ahead appearing on the display screen.

It is assumed that, in the inter-car distance detecting device thus arranged, the image 5a of the car ahead (hereinafter referred to as "a second car", when applicable) which is to be tracked, comes in the image picked up by the lower image sensor 3, thus being displayed on the display screen with the first and second windows 15 and 16 set as shown in FIG. 2. In this case, the driver operates his car (hereinafter referred to as "a first car", when applicable) to change the relative position of his car and the car ahead until the image 5a of the car ahead comes in the first window 15.

When the image 5a of the car ahead comes in the first window 15 as shown in FIG. 3, the driver operates the image tracking instruction switch 13. When the switch 13 is operated in this manner, an image tracking operation is automatically carried out: that is, no matter how the image of the car ahead moves in the display screen the first window 15 is moved to track the image of the car ahead. When, in the image tracking operation, the first window 15 is moved, the second window 16 is also moved together with it. The above-described image tracking operation has been disclosed by Japanese Patent Examined Publication Nos. Sho-60-33352/(1985) and Hei-1-35305/(1989).

Now, a method of detecting the distance between a car and the one ahead will be described. First, the microcomputer 10 reads out form the memory 8 the image signal corresponding to the image in the first window which is tracking the image 5a of the car ahead, and employs it as a reference image signal for calculation of the distance from the car ahead. In the memory 9, in which the image signal of the upper image sensor is stored, the region corresponding to the first window 15 is selected by the microcomputer 10. Thereafter, while shifting the image signal of the memory 9 one picture element at a time with respect to the reference image signal, the microcomputer calculate the sum of the absolute values of the differences between the image signals which are provided for the upper and lower picture elements, respectively.

Figure 4:
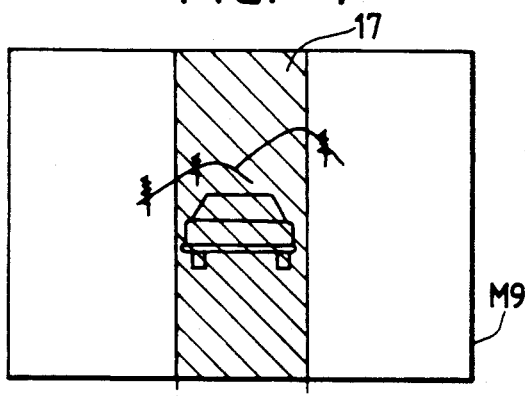
FIG. 4 is an explanatory diagram showing an image region to be compared with the image in the first window.

That is, the sum is obtained by shifting the image one by one picture element at a time which agrees best with the image in the first window 15. In this case, the arithmetic operation concerns the region 17 in the memory 9 which corresponds to the position of the first window 15 as shown in FIG. 4. In FIG. 4, reference character M9 designates the image formed by the image signal in the memory 9; and M8, the image formed by the image signal in the memory 8.

In the case where the upper and lower picture elements are subjected to comparison as described above, when the sum of the absolute values of the resultant difference signals is minimum, the amount of shift of the picture element is represented by n picture element with a picture element pitch of P; then the distance (R) from the car ahead can be calculated from the following Equation (2):

$$R = (f \times L)/(n \times P) \tag{2}$$

where L is the base length of the optical systems, and f is the focal length of the lenses 1 and 2.

Thus, even when the image of the car ahead, for which the window has been set, is moved right or left, it is tracked at all times, so that the distance from the car can be obtained continuously.

Now, a method of correcting the position of the window by the window correcting unit 14 will be described. With the unit 14, the distance from an object held in the second window 16 set in the first window which is tracking the image 5a of the car ahead can be obtained similarly as in the above-described case.

As shown in FIG. 4, when the first window 15 surrounds the image 5a of the car ahead in the image M8 formed by the image signal in the memory 8, the images of the roof and the rear window of the car ahead may come in the second window 16. In this case, the microcomputer 10 reads from the memory 8 the image signal representing the image in the second window 16, and employs it as a reference image signal for calculation of the distance.

The microcomputer 10 selects the region 17 of the image M9 from the memory 9 in which the output image signal of the image sensor 4 is stored, because the region 17 corresponds to the second window 16. And while shifting the image signal of the region 17 one picture element at a time with respect to the reference image signal, the microcomputer 10 calculates the sum of the absolute values of the differences between the image signals which are provided for the upper and lower picture elements, respectively, thereby to obtain the position of the image which agrees best with the image in the second window 16.

If it is assumed that the amount of shift of the picture element is represented by m picture elements when the above-described sum is minimum, then the distance (A) from the object held in the second window 16 can be calculated from the following Equation (3) which is similar to Equation (2):

$$A = (f \times L)/(m \times P) \tag{3}$$

Figure 5:
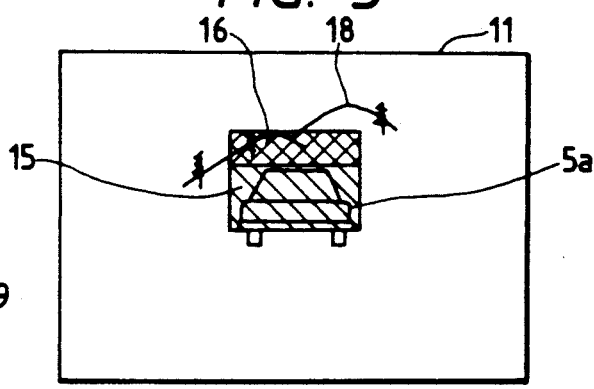
FIG. 5 is an explanatory diagram showing the first window which is shifted upwardly with respect to the image of the car ahead.
Figure 6:
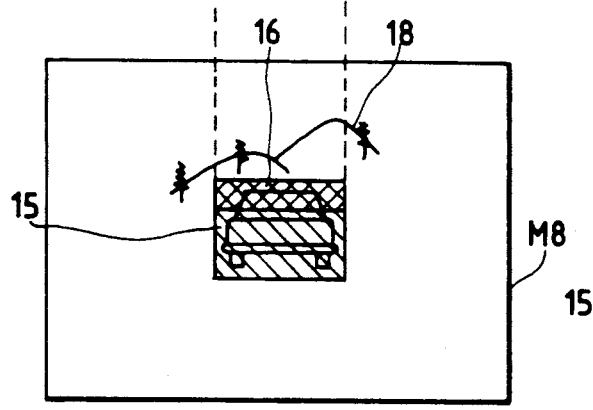
FIG. 6 is an explanatory diagram showing the first window which is shifted downwardly with respect to the image of the car ahead.
Figure 6:
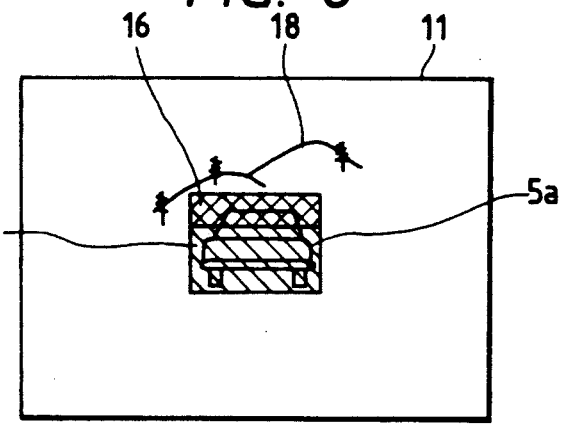

The distance R between the two cars and the distance A from the object held in the second window 16 are detected at all times and applied to the window correcting unit 14. In the case where the car may bound due to road unevenness, as shown in FIG. 5, the first window 15 is shifted upwardly with respect to the image 5a of the car ahead, so that the image 18 of the mountain in the background comes in the second window 16, and the distance A from the background is measured and compared with the distance R. When it is determined that the distance A thus measured is larger than the distance R, the window correcting unit 14 operates to move the first window 15 downwardly with respect to the image 5a of the car ahead until the images of the roof and the rear window of the car ahead are held in the second window 16.

When the distances A and R become substantially equal to each other, the window correcting unit 14 operates to move the first window 15 upwardly with respect to the image 5a of the car ahead. If the first window 15 is moved excessively upwardly, then the distance A becomes larger than the distance R again.

The first window 15 is repeatedly moved upwardly and downwardly in the above-described manner. This prevents the first window 15 tracking the image 5a of the car ahead from being greatly shifted in a vertical direction. That is, the image of the car ahead can be tracked with high stability.

For instance in the case where the image of the background of the car 5 ahead held in the second window 16 is a blue sky with no cloud, the region 17 in FIG. 4 includes a number of positions the images at which agree with the image in the second window 16. More specifically, in the region 17, there are positions the images at which agree with the image held in the second window 16, in all the portions displaying the image of the blue sky as well as in a comparison portion 16a, as shown in FIG. 7. In the case where the image sensor 4 adapted to pick up a comparison image which is to be compare with a reference image for inter-car distance calculation is set above the image sensor 3 adapted to pick up the reference image as was described above, the portion of the region 17, such as the comparison portion 16b, which displays the image of the sky, is positioned where the amount of shift (m) of the picture element of the image sensor 4 is decreased.

Accordingly, a number of images which agree with the image in the window are available where the distance (A) from the background calculated from Equation (3) is larger than calculated by using the comparison portion 16a. On the other hand, in the case where an image sensor 4a adapted to pick up the comparison image is disposed below the image sensor 3, the comparison portion 16b is positioned where the amount of shift (m) of the picture element of the image sensor 4a is increased. Therefore, in this case, a number of images agreeing with the image in the window are available where the distance (A) from the background calculated from Equation (3) is smaller than calculated by using the comparison portion 16a.

With the inter-car distance detecting device of the invention, the position of the first window 15 is corrected on the fact that the distance (A) from the background is larger than the distance (R) between the two cars (hereinafter referred to as "an inter-car distance (R)", when applicable). Hence, the distance (A) from the background will cause no trouble in practical use even if it is erroneous on the side of long distance; however, the error cannot be allowed that the distance (A) from the background is smaller than the inter-car distance (R). Accordingly, in the inter-car distance detecting device of the invention, the image sensor 3 adapted to pick up the reference image for distance calculation is arranged below the image sensor 4 adapted to pick up the comparison image. The optical systems, the image sensors, etc. may be arranged not only vertically but also horizontally or obliquely. In addition, the inter-car distance detecting device may be so designed as to use one image sensor instead of the two image sensor.

Figure 8:
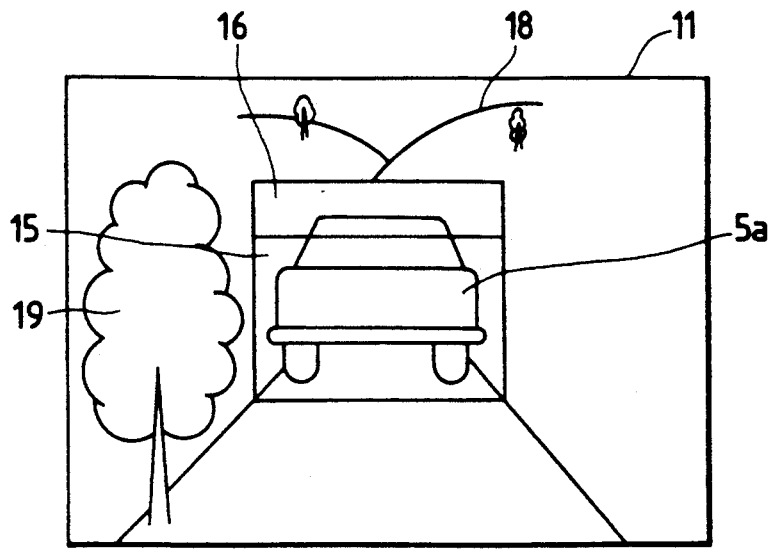
FIG. 8 is an explanatory diagram showing the first window which remains unchanged in size, with the suitable ratio of the image of the car ahead to it.

Now, a method of changing the size of the windows with the window position correcting unit 12 will be described. In FIG. 8, the image 5a of the car ahead is surrounded by the first window 15 whose size has been set at the start of the tracking operation, and the ratio of the image 5a to the first window 15 in area is suitable.

Figure 9:
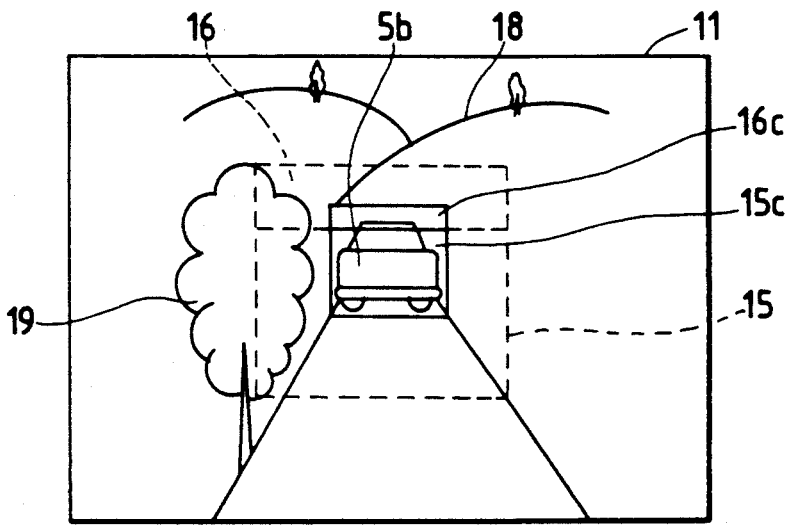
FIG. 9 is an explanatory diagram showing the first window which is reduced in size with the increasing distance from the car ahead so as to hold the image of the car ahead in it in such a manner that the rate of the image of the car ahead to the first window in area is appropriate.

When the car 5 ahead increases the speed, or the car on which the inter-car distance detecting device is mounted decreases the speed, the distance between the two cars is increased. As a result, the image 5a of the car ahead shown in FIG. 8 is gradually decreased in area; that is, it is changed into the image 5b as shown in FIG. 9. In this case, the window position unit 14 operates to continuously or discretely reduce the size of the first window 15 surrounding the image 5a with the increasing distance R from the car 5 ahead.

The size of the first window 15 can be decreased to the size of a first window 15c shown in FIG. 9, so that the image 5b of the car ahead which is decreasing in size with the increasing distance R appears in the window in such a manner that the ratio of the image 5b to the window in area is acceptable. In this case, the ratio of the image 5a of the car ahead to the first window 15 in area in FIG. 8 is substantially equal to the ratio of the image 5b of the car ahead to the first window 15c in area in FIG. 9.

Figure 10:
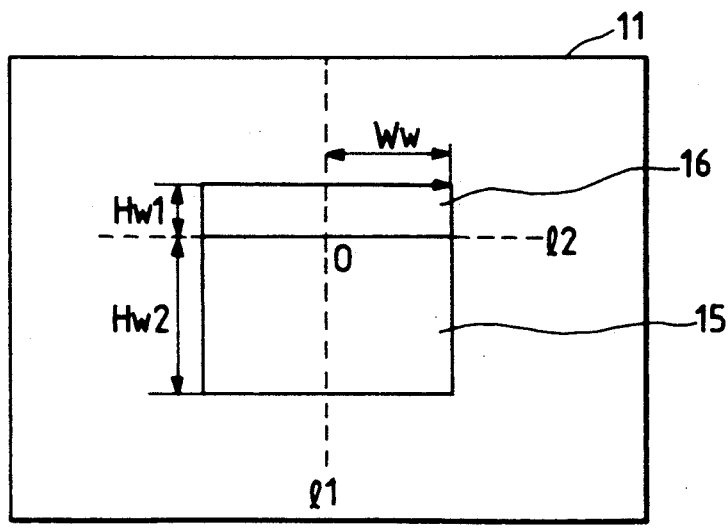
FIG. 10 is an explanatory diagram showing the method for changing the window size.

Similarly as in the case of the first window 15, the second window 16 can be decreased in size with the distance from the car 5 ahead; that is, the size of the second window 16 can be decreased to that of a second window 16c shown in FIG. 9. The distance A from the object held in the second window, and the distance obtained by using the first window 15c are utilized to perform a window position correcting operation similarly as in the above-described case. In the embodiment, the first and second windows is increased or decreased in size with the window correcting unit 14 as follows:

That is, as shown in FIG. 10, the first window 15 and the second window 16 are increased or decreased in size in a vertical direction and in a horizontal direction with the point O as the center. In other words, the windows are increased or decreased in size with the dotted lines $l_1$ and $l_2$ as reference center lines. The dotted line $l_1$ is the vertical bisector of the first and second windows 15 and 16, and the dotted line $l_2$ is the elongation of the base of the second window 16.

The length $W_W$ in a horizontal direction and the lengths $H_W1$ and $H_W2$ in a vertical direction are increased or decreased to increase or decrease the size of the first and second windows 15 and 16. In this case, $W_W = $ (window width) $\times \frac{1}{2}$; $H_W1 = $ vertical length of the second window 16; and $H_W2 = $ vertical length of the first window 15. The horizontal length $W_W$ and the vertical lengths $H_W1$ and $H_W2$ may be increased or decreased at the same ratio or at different ratios.

In the embodiment, the ratio of the second window 16 to the first window 15 in area is relatively small, about $\frac{1}{4}$. Hence, if the horizontal length $W_W$ and the vertical length $H_W1$ of the second window 16 are reduced to considerably small values by the window correcting unit 14, then the second window 16 is excessively small in area, and accordingly the amount of data on the object held in the second window is decreased as much. As a result, distance A may not be detected by the above-described distance detecting means. In order to eliminate this difficulty, minimum values are determined only for the lengths $W_W$ and $H_W1$ of the second window. That is, the window position correcting unit is so controlled as not to reduce those lengths to less than the minimum values.

The means for changing the size of the first and second windows 15 and 16 changes the first window 15 into the first window 15c in the above-described manner. As is seen from FIG. 9, the ratio of the image 5b of the car ahead to this first window 15c in area is more suitable than that of the same image to the first window 15 in area which is not changed in size by the correcting unit 14. This can eliminate the difficulty that, as in the case of the first window which is not changed in size by the correcting unit 14, the window is shifted being affected by a background object 19 such as a tree, as in the case of the first window 15. That is, the image of the car ahead can be tracked stably.

The same thing can be said about the second window 16. That is, as shown in FIG. 9, the second window 16c, into which the second window 16 has been changed by the means for changing the size of the windows 15 and 16, unlike the second window 16 which is not changed in size by the correcting unit 14, will not hold the images of background objects such as a tree 19 and a mountain 18 together with the images Of the rear window and the roof of the car ahead. Accordingly, the data on the object held by the second window 16 is always stable, and the distance A obtained through the second window 16c is accurate. As a result, the window position correction operation on the above-described distances A and R is positively carried out, thus allowing the tracking of the image of the car ahead with high stability.

In the above-described embodiment, the first and second windows 15 and 16 is continuously or discretely changed in size according to the distance R from the car ahead by the means for changing the size of the first and second window. However, the method of changing the size of the first and second windows 15 and 16 with the window correcting unit 14 can be modified freely according to the operating characteristic of the image tracking unit, with substantially the same effects as in the above-described embodiment.

Furthermore, in the above-described embodiment, the first and second windows are increased or decreased in size by using the horizontal length $W_W$ and the vertical lengths $H_W1$ and $H_W2$ with the increasing or decreasing reference point or lines set as described above. The method of increasing or decreasing the windows in size, and the setting of the reference point and lines can be modified freely depending on the configurations of the windows and the operating characteristic of the image tracking unit, with substantially the same effects as in the above-described embodiment. Moreover, in the above-described embodiment, the optical systems, the images sensor, or the like are arranged vertically; however, they may be arranged horizontally or obliquely. In addition, the inter-car distance detecting device can be formed using one image sensor.

As was described above, the inter-car distance detecting device of the invention comprises: the image sensor means for picking up the image of a car ahead through a pair of optical systems arranged substantially vertically; the display means for displaying the image of the car ahead; the first window surrounding the image of the car ahead; the image tracking means for tracking the image of the car ahead with the first window; the second window set in the first window; the first and second distance detecting means for calculating the distances from the objects held in the first and second windows, respectively; and the window position correcting means for correcting the position of the first window surrounding the image of the car ahead, according to the distances calculated by those distance calculating means. That is, with the device, even if there are a plurality of cars ahead, the car selected is specified by the window. Accordingly, the driver can readily recognize the car ahead the distance from which is being measured with his car following it.

With the device of the invention, the position of the first window holding the image of the car ahead is corrected according to the distances obtained with the aid of the first and second windows. Hence, the shifting of the image of the car ahead from the first window can be prevented, which otherwise may be caused for instance when the car bounds on which the device is mounted. Furthermore, the first window surrounding the image of the car ahead and the second window set in the first window are changed in size according to the distance (R) from the car ahead which is detected with the aid of the first window. Accordingly, the ratio of the image of the car ahead, which changes in size with the distance R, to the first window in area is maintained suitable at all times. Hence, the window is prevented from being shifted by the change in size of the image of the car ahead and the effect of background objects. That is, the image tracking operation is carried out with high stability.

In addition, with the device of the invention, the second window is also changed in size according to the distance R between the two cars. Therefore, the information held by the second window is stable, and the distance A from the object held in the second window can be measured with high accuracy. Accordingly, the window position correcting operation is achieved with higher accuracy. That is, the image tracking operation is performed with higher stability.

What is claimed is:

1. An inter-car distance detecting device in which image signals representing images formed on image sensor means through a pair of first and second optical systems are compared with each other, so as to electrically detect an amount of shift of said images from each other, thereby to measure a distance between a first car and a second car ahead of said first car, said distance detecting device comprising:

display means for displaying an image of said second car picked up by said image sensor means through said first optical system;

a first window for surrounding the image of said second car;

image tracking means for tracking the image of said second car within said first window;

first distance detecting means for detecting a distance R between said first car and said second car ahead, said first distance detecting means detecting a difference between the image signal picked up through said second optical system with the image signal in said first window as a reference image signal;

a second window set in said first window and surrounding a portion less than the whole of an image displayed in said first window;

a second distance detecting means for detecting a distance A between said first car and an object specified with said second window, said second distance detecting means detecting a difference between the image signal picked up through said second optical system with the image signal in said second window as a reference image signal; and window position correcting means for correcting a position of said first window surrounding the image of said second car, according to distance data detected by said first and second distance detecting means by comparing distance R with distance A.

2. An inter-car distance detecting device as claimed in claim 1 further comprising window size changing means for changing said first and second windows in size according to said distance data provided by said first distance detecting means.

3. An inter-car distance detecting device as claimed in claim 1, wherein said pair of first and second optical systems are arranged with a predetermined distance therebetween.

4. An inter-car distance detecting device for detecting the distance between an operator's car and a car ahead of the operator, said device comprising:

(a) first distance detector for detecting said distance on the basis of a reference image of the car ahead contained within a large window on a display screen;

(b) second distance detector for detecting said distance on the basis of a reference image of a portion of the car ahead contained within a small window which is located inside of the large window; and (c) window position corrector which corrects a position of said large window by comparing the results of the first and second distance detectors.

5. A device as claimed in claim 4 in which said device includes a detector which detects an amount of shift of images formed on an image sensor.

6. A device as claimed in claim 5 in which said device includes a window size changer which changes the size of said windows according to detected distances.

* * * * *